United States Patent [19]

Wilson

[11] 3,836,167
[45] Sept. 17, 1974

[54] VEHICLE SAFETY APPARATUS
[75] Inventor: Kenneth R. A. Wilson, Fort Erie, Ontario, Canada
[73] Assignee: Irvin Air Chute Ltd., Ontario, Canada
[22] Filed: Sept. 27, 1971
[21] Appl. No.: 184,102

[52] U.S. Cl. ............... 280/150 AB, 137/68, 222/3, 180/103
[51] Int. Cl............................................. B60r 21/08
[58] Field of Search.......... 280/150 AB; 137/68, 69, 137/70, 71; 180/103

[56] References Cited
UNITED STATES PATENTS

| 3,527,472 | 9/1970 | Chute et al.................. | 280/150 AB |
| 3,582,107 | 6/1971 | Goetz et al................... | 280/150 AB |
| 3,625,543 | 12/1971 | Wolff............................ | 280/150 AB |
| 3,642,303 | 2/1972 | Irish et al. .................... | 280/150 AB |
| 3,663,035 | 5/1972 | Norton ......................... | 280/150 AB |
| 3,684,309 | 8/1972 | Uchiyamada et al......... | 280/150 AB |
| 3,713,667 | 1/1973 | Blanchard .................... | 280/150 AB |

*Primary Examiner*—David Schonberg
*Assistant Examiner*—John P. Silverstrim
*Attorney, Agent, or Firm*—Ryder, McAulay, Fields, Fisher & Goldstein

[57] ABSTRACT

An inflator system for a vehicle safety apparatus including an inflatable bag which uses a gas container having two exit orifices either or both of which may be used at the time of a collision to inflate the bag.

4 Claims, 5 Drawing Figures

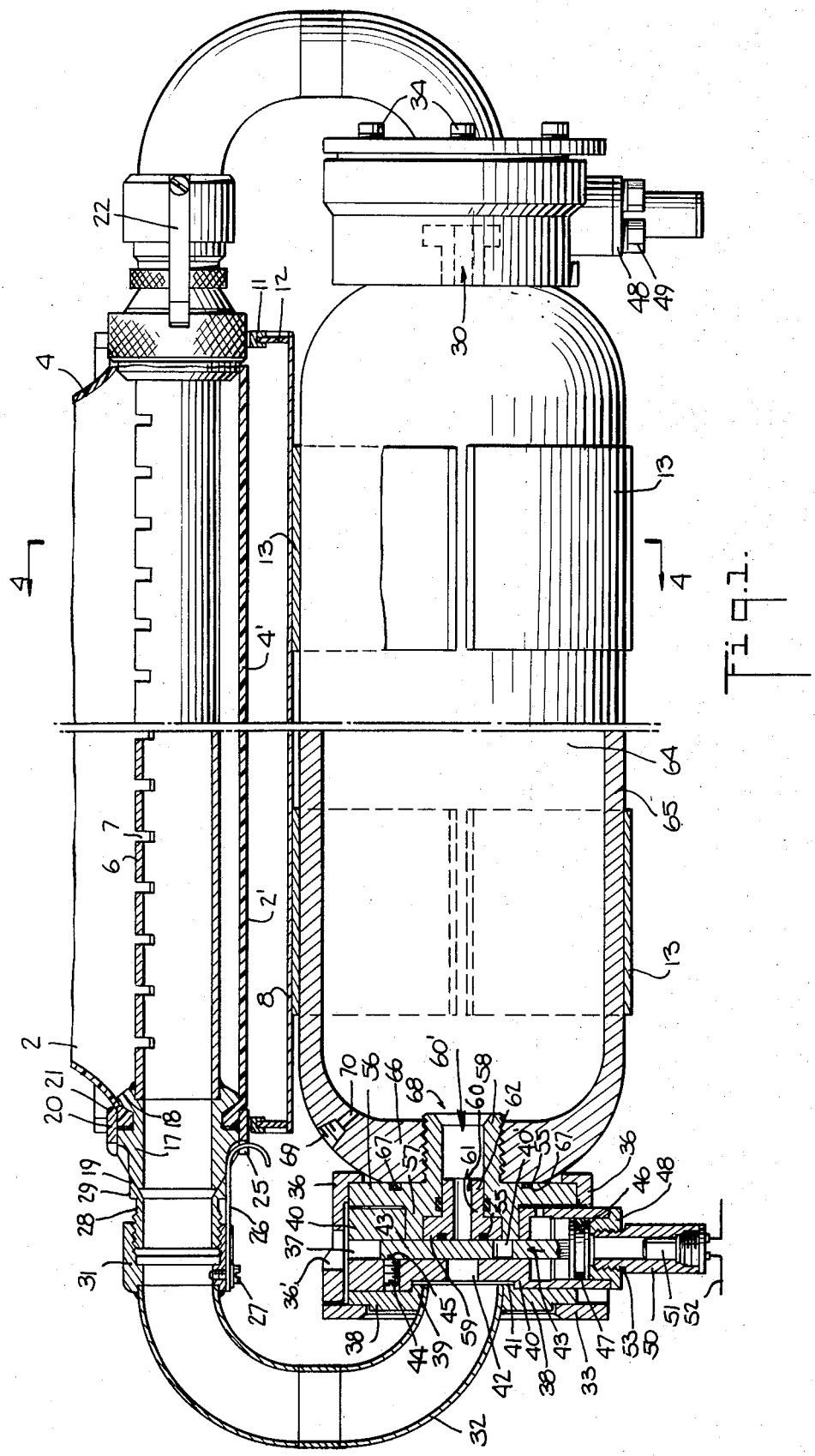

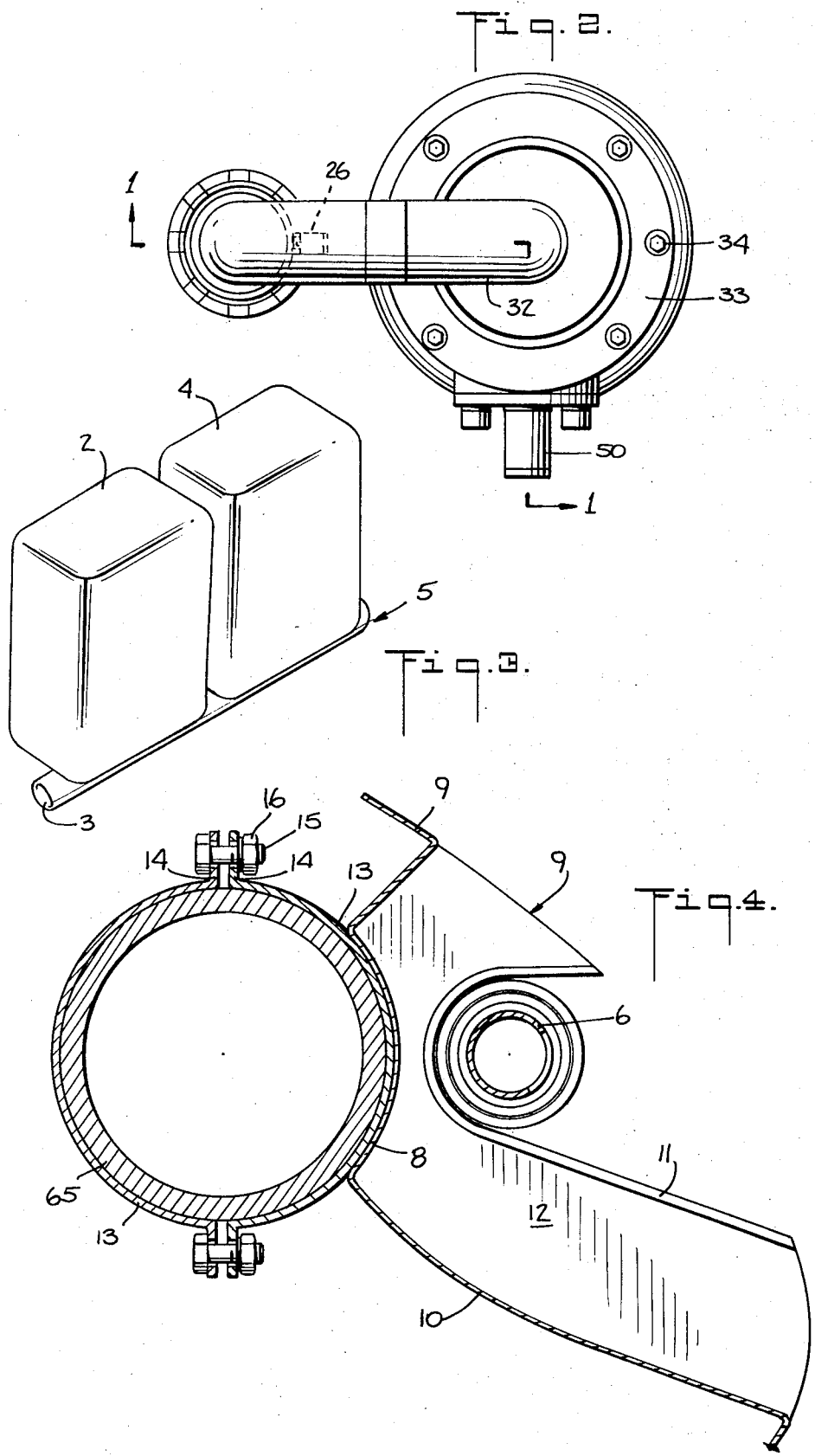

VEHICLE SAFETY APPARATUS

SUMMARY OF THE INVENTION

This invention is an inflator system for use in a vehicle safety apparatus including an inflatable bag which comprises a gas container having two exit orifices disposed on opposite sides of the bag, either or both of which may be used at the time of collision to inflate the bag. Use of two orifices reduces the noise on inflation and, should one orifice fail, the other would still be operable. Use of two orifices also permits rapid inflation of the bag at the time of the collision. In a further embodiment there is provided means for sensing the severity of a collision and means for varying the rate of inflation of the bag commensurate with the severity of the collision. In a preferred form, two exit orifices of different sizes are provided in the gas container. The smaller orifice may be used to give a relatively slow rate of bag inflation and the larger orifice may be used to give a more rapid rate of inflation. Alternatively, both orifices may be used to give an even more rapid rate of inflation. Means are provided to detect conditions arising during a collision and to actuate the system and provide a rate of inflation commensurate with those conditions.

BACKGROUND OF THE INVENTION

There have been proposed a number of versions of inflatable bag systems for restraint of passengers during an automobile collision.

During a collision of automobiles, there is only a short time available for inflation to protect a passenger, in the range of about 30 to about 150 milliseconds. Any system of this type must, therefore, be capable of inflation within the shorter period of time, in addition, of course, to being dependable. When a restraining bag is rapidly inflated, however, it has a capability of hitting and injuring the passenger because of the rapid inflation. Also, rapid inflation may throw the passenger back against his seat. In collisions occurring at low speeds, there exists more time for the inflation, and at a lower rate of inflation, the possibility of injury to the passenger from the force of the bag is lower. It is, therefore, desirable that an inflation system also be adaptable to vary the rate of inflation depending on the conditions occurring during a collision.

In one embodiment of this invention, a gas container is provided which has at least two orifices disposed at its ends, the orifices when open passing gas to opposite sides of the bag to inflate it. Such a system assures inflation of the bag even though one of the orifices may fail. In addition, use of both orifices provides uniform inflation of the bag, permits a rapid rate of inflation and reduces the noise occurring from the passage of the gas into the bag during inflation.

In a further embodiment, the gas container also has at least two orifices so disposed and so acting to inflate the bag, but one has a diameter smaller than the other. The system (in either embodiment) is only actuated when the severity of the collision exceeds a level equivalent to a minimum speed, say 10 mph. When collision conditions are relatively low, say 10–18 mph, under the second embodiment, the smaller orifice is opened to inflate the restraining bag. When the conditions are intermediate, say 18–25 mph, the larger orifice alone is opened. Under conditions exceeding 25 mph, both orifices are used to inflate the bag. In this further embodiment, means are provided to detect the severity of conditions and to open the orifice or orifices necessary to provide inflation of the bag commensurate with the conditions.

The first embodiment of this invention therefore provides a reliable, quickly inflatable restraint bag system, and the second embodiment further provides a system capable of varying the rate of inflation depending on the severity of the conditions occurring during a collision.

BRIEF DESCRIPTION OF THE DRAWINGS

In the drawings,

FIG. 1 is a sectional front view of a preferred form of the apparatus of this invention taken along line 1—1 of FIG. 2.

FIG. 2 is a side view of the apparatus of this invention.

FIG. 3 depicts bags in inflated form for use with this invention.

FIG. 4 is a cross section taken along line 4—4 of FIG. 1.

DETAILED DESCRIPTION OF THE PREFERRED EMBODIMENTS

Figure 5:
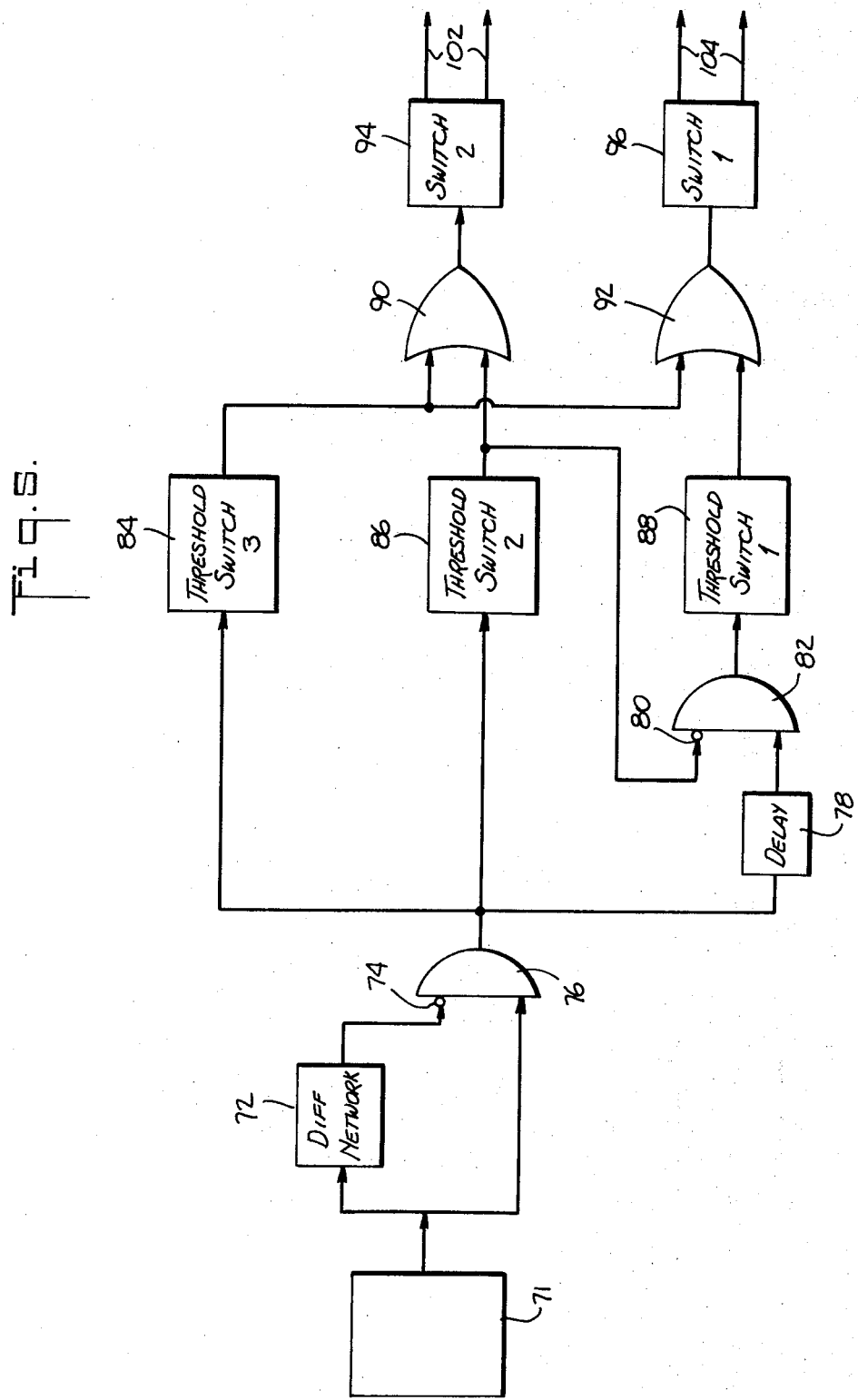
FIG. 5 is a detection and actuation system for use with the second embodiment of this invention.

The inflation system of this invention is shown in the Figures. In FIG. 3 is shown a double bag system (in inflated condition) which is preferred for use with this invention. When inflated, the bags in width fit the space where the passengers sit beside the driver and in length project to contact and restrain the passengers. A single bag of twice the size of one may also be used with this invention. In using the preferred two-bag system, the first bag 2 and the second bag 4 (which may be made of any gas impermeable material) have a common bottom portion (as shown in FIG. 3 and as 2' and 4' in FIG. 1) which is attached to a slotted diffuser 6 (FIG. 1) through which gas from each orifice passes when the bags are inflated. The apparatus may be mounted under the dashboard of an automobile so that when there is a collision, the bags are inflated and their longer portions move horizontally toward the passengers to restrain their forward movement. The use of two bags permits independent control of each of two passengers who may be sitting adjacent to the driver.

Referring to FIGS. 1 – 4, a gas container 64 is interconnected with a slotted pipe diffuser 6 having slotted openings 7. Bags 2 and 4 are connected to the diffuser which is located in the lower portions of the bags by insertion through either of the circular openings 3 and 5 at each end of the bags. The bag at opening 3 extends around collar 18 of the cylindrical part 17 which is fixed to diffuser 6 and the bag is held between collar 18 and the outer part 21 of ring 20. When the threaded ring 20 is rotated it advances and its outer part 21 secures the bag between it and collar 18. The other end of the bag through opening 5 is similarly attached at the other end of the diffuser. The bottoms of the bags, 2' and 4', seal the bags below the diffuser.

The cylindrical part which is fixed to the diffuser 6 has a sloping face 19. Connector ring 28 is threadedly connected to flange 31 which is fixed to pipe 32 through which gas from the bottle 64 passes when the bags are inflated. Connector ring 28 has a sloping face 29 which matches and bears on face 19 of part 17 when the apparatus is assembled. A spring clip 26 positions connector ring 28 in alignment with diffuser 6 and cylindrical part 17. Rotation of the ring 28 tightens faces 29 and 19 against each other.

Below the diffuser 6 is a sheet metal housing 8 which conforms to the curvature of gas container 64 and is fixed to cylindrical brackets 13 which extend around the bottle and have extended portions 14 which are clamped together by bolts 15 and nuts 16 to secure brackets 13 around the bottle. When the apparatus is secured under the dashboard of an automobile leg 9 of housing 8 extends under the dashboard and may be used for mounting the apparatus to it. Leg 10 of the housing 8 extends just to the front of the dashboard. The line 9' extending from leg 9 defines the end of leg 10. The U-shaped part 11 is attached to web 12 and extends around connector ring 20 and forms a part of housing 8 in which the bags are contained when deflated. The leg 10 serves as a support for the bottom of the bags during inflation.

Pipe 32 is connected to the gas container 64 in the following manner. An annular plate 38 is fixed to pipe 32. A retaining plate 33 is held against annular plate 38 by bolts 34. The annular plate 38 is connected to a guide body 40 through its extended portion 39 which fits within cut-out portion 41 of guide body 40. Piston 43 is adapted to travel reciprocally through the bore 37 of guide body 40. A spring loaded pin 44 extends through the upper part of guide body 40 and its detent portion 45 sits in a corresponding cut out portion of piston 43. An annular member 56 bears against one side of annular plate 38 and against the end 66 of container 64. Member 56 has a cylindrical extended part 57 extending within a cut-out portion of guide body 40 to its bore. The part 59 of bushing 61 fits within portion 47 of member 56, and the extended portion 62 of it fits within the projecting part 58 of member 56 (FIG. 1). The gas container 64 has a cut-out portion 68 which is threadably connected to the extended part 58 of annular member 56. Plastic gas seals are shown generally as 55 in a number of positions in FIG. 1. Orifice 60 of bushing 61 meters the gas passing from bottle 64 when the bags are inflated.

A sensing device (which may be any conventional device such as a strain gage) is connected by leads 52 to an explosive charge 51 which is contained in chamber 50 which is threadably connected with cover 48 of the guide body 40. The cover 48 is held in place by bolts 49. When a collision occurs, the device senses it and electrically sets off the charge 51. When the charge is set off a gas pressure is generated overcoming the restraining force of pin 44 and the piston 43 is driven upwardly so that its opening 40' is in line with orifices 60 and 60' thereby permitting the gas in container 64 to pass into pipe 32 and through diffuser 6 into the bags inflating them to restrain any passengers in the front seat of the automobile.

A spring clip 26 is attached to member 31 by screw 27 and its end fits within a cut-out portion 25 of part 17. Another spring clip 22 in the right section of the apparatus is located in a position 90° different from clip 26 in the left section. The spring clips serve to locate connector ring 28, and its corresponding one in the right section, in alignment with the diffuser 6 and on assembly of the apparatus connector ring 28, and its corresponding one in the right section, are tightened so that faces 19 and 29 in the left section, and the corresponding ones in the right section, bear against each other thus connecting the diffuser in an air tight manner with the container 64.

The piston 43 has an O-ring 46 and a seal 47 to seal the piston 43 against the gas pressure produced by the charge 51. Retainer 36 extends around guide body 40 and holds the assembly in place in cooperation with plate 33. Retainer 36 has a vent hole 36' eliminating back pressure on piston 43 when it is actuated and moves upwardly.

The right portion of the apparatus shown in FIG. 1 is identical to its left portion and has an orifice 30 corresponding to orifice 60 of the left portion. In this embodiment each of the orifices may be on the order of 0.5 inch in diameter. A preferred pressure in the bags when inflated and not acting on a passenger is on the order of 2 psig.

The container 64 contains an inert gas such as nitrogen under pressure, for example a pressure of 3,500 psig, which is retained by metal wall 65 of the container, which holds about 160 in.$^3$ of gas. The container on its end 66 is sealed against member 56 by seal 67. Similar gas seals are generally designated as 55 in FIG. 1. At the end 66 of the container a hole 70 is tapped and contains a shutter valve 69 which is used to fill the container with the gas.

When there is a collision above a minimum level, say 10 mph, the charges in the apparatus (attached by leg 9 under the dashboard of an automobile) are set off, the pistons, for example 43, move into alignment with the orifices, and the gas in the container 64 is passed through orifices 30 and 60 through diffuser 6 to the bags 2 and 4 uniformly inflating them and restraining any passengers sitting in front of the system.

By using two orifices, the bags 2 and 4 may be rapidly inflated. In addition, the noise level on inflation is reduced and, should one of the orifices not function, the bags may still be inflated through the other orifice.

After inflation of the bags, the apparatus may be reused by venting and collapsing the bags by unscrewing one of the connector rings (for example 28 in FIG. 1) and by reassembling the apparatus and refilling container 64 through valve 69.

In order to reduce the force exerted on a passenger during a collision, the bags 2 and 4 may contain blow out valves which pass gas from the bag when the pressure in the bags exceeds a specified level. The bags, alternatively, may be made of a fabric having a variable porosity, which increases with gas pressure in the bags, and leaks gas when it is acting to restrain a passenger, as described in copending U.S. Pat. application Ser. No. 101,253.

The gas used in carrying out this invention may, of course, also be generated in a conventional manner, but it has been found that nitrogen under pressure is preferred for use with this invention.

In a second embodiment of this invention, orifice 30 is smaller than orifice 60. In this embodiment orifice 30 may be on the order of 0.3 inch in diameter and orifice 60 on the order of 0.6 inch in diameter.

Under collision conditions relatively less severe, (say 10–18 mph) the smaller orifice 30 may be used alone to give a relatively lower rate of bag inflation. Under intermediate conditions (say 18–25 mph) orifice 60 may be used alone. Under the most severe conditions (above 25 mph) both orifices may be used to give a rapid rate of bag inflation.

Using the second embodiment of this invention, there is thus provided a system which has a variable rate of inflation depending on the severity of the collision conditions. Using this inflation system, the restraining bag is therefore only inflated at a rate necessary due to existing conditions and is not rapidly inflated when collision conditions do not warrant it, thus reducing the instances in which the impact of the bag on a passenger is at a maximum.

A number of means may be used to sense the degree of severity of the conditions at the time of a collision and to open either or both of the orifices 30 and 60.

A preferred system for use with the second embodiment is shown in FIG. 5.

In FIG. 5, a sensor 71, such as a strain gage, quantitatively detects the severity of conditions arising during a collision and passes a signal proportionate to the severity of conditions to three threshold switches, one operating at a low level, for example (10–18 mph) one at an intermediate level (18–25 mph), and one at a high level (above 25 mph). The system of FIG. 5 thereby opens orifice 30 if the conditions are in the range of 10 to 18 mph, opens orifice 60 if conditions are in the range of 18 to 25 mph, and opens both orifices if the conditions exceed a rate of 25 mph. The output of strain gage 71 passes to differential network 72 which is connected to inhibit circuit 74 which closes AND gate 76 when the output of gage 71 is changing and opens it after the output of gage 71 is essentially constant, shortly after the start of a collision. The output of gage 71 when constant is passed to the three threshold switches 84, 86 and 88. Gage 71 is connected to AND gate 76 which is connected through a delay switch 78 and AND gate 82 to the first threshold switch 88. The switch 88 is connected through OR gate 92 to transistor switch 96 which is normally open and closes on a signal from gate 92 to complete a circuit containing a source of direct current (not shown) and to pass current through leads 104 which are connected to leads (corresponding to 52 in FIG. 1) to fire the charge for opening orifice 30. The first threshold switch 88 is actuated at the lowest level of collision conditions, 10–18 mph. The second threshold switch 86 is actuated above conditions corresponding to 18 mph and the third threshold switch 84 above conditions corresponding to 25 mph. At intermediate collision conditions (18–25 mph) the threshold switch 86 (1) closes AND gate 82 by actuating inhibit circuit 80 and thereby cuts out orifice 30 and (2) through transistor switch 94 (similar to 92) passes current through leads 102 to leads 52 (see FIG. 1) firing charge 51 to open orifice 60. The delay switch 78 is adjusted so that there is a sufficient delay time to enable the second threshold switch 86 to act on inhibit circuit 80 and close AND gate 82 if conditions exceed a minimum, for example, 18 mph. At conditions above 25 mph the third threshold switch 84 is activated and closes both switches 94 and 96 opening both orifices 30 and 60.

A further variation of the second embodiment involves initial opening of smaller orifice 30 and subsequent opening, if collision conditions are severe, of the larger orifice 60. This provides a two-step system in which the use of each orifice is cumulative. A three-step cumulative system may also be used. In such a system three orifices of increasing size would be provided and the smallest, intermediate one and the largest would be opened commensurate with the severity of the collision conditions. Under this variation, whether two-step or three-step, means for sensing collision conditions would be associated with each orifice, and a larger orifice would only be opened if the severity of the collision conditions were above a predetermined level. In this variation a time delay between actuating the small orifice and a larger one could be provided. With suitable modifications, the system of FIG. 5 could be used with this variation.

In using the second embodiment, a separate inflation system for each bag could be provided and variably inflated dependent on the body weight of the passenger in front of it and the severity of the collision conditions.

In using the first or second embodiment of this invention a separate inflation system in accordance with it may be used for each restraining bag.

This invention provides a dependable quickly inflatable restraining bag system which is also capable of a variable rate of inflation depending on the severity of collision conditions.

I claim:

1. A vehicle safety apparatus comprising:
   a inflatable bag,
   a gas diffuser attached to the bag and having first and second opposed ends,
   a source for gas under pressure,
   a first normally closed orifice between said source and a first end of said diffuser,
   a second normally closed orifice between said source and said second end of said diffuser, the diameter of said second orifice being larger than the diameter of said first orifice,
   sensing means for sensing at least two levels of severity of collision,
   first responsive means automatically responsive to said sensing means to open said first orifice and establish communication between said source and said first end of said diffuser when said severity is above a first predetermined level, and
   second responsive means automatically responsive to said sensing means to open said second orifice and establish communication between said source and said second end of said diffuser only when said severity of collision is above a second predetermined level, said second predetermined level being greater than said first predetermined level.

2. The apparatus of claim 1 wherein said first orifice has a diameter of about 0.3 inch and said second orifice has a diameter of about 0.6 inch.

3. A vehicle safety apparatus comprising:
   an inflatable gag,
   a gas diffuser attached to the bag and having first and second opposed ends,
   a source for gas under pressure,
   a first normally closed orifice between said source and a first end of said diffuser,
   a second normally closed orifice between said source and said second end of said diffuser, said second orifice being larger than said first orifice,
   sensing means for sensing at least three levels of severity of collision,
   first responsive means automatically responsive to said sensing means to open solely said first orifice and establish communication between said source and said first end of said diffuser when said severity is above a first predetermined level and below a second predetermined level, second responsive means automatically responsive to said sensing means to open solely said second orifice and establish communication between said source and said second end of said diffuser when said severity of collision is above said second predetermined level and below a third predetermined level, and third responsive means automatically responsive to said sensing means to open both of said orifices and establish communication between said source and both of said ends of said diffuser when said severity of collision is above said third predetermined level, said third predetermined level being greater than said second predetermined level.

4. The apparatus of claim 3 wherein said first orifice has a diameter of about 0.3 inch and said second orifice has a diameter of about 0.6 inch.

* * * * *